United States Patent

Schurr et al.

[15] 3,635,810

[45] Jan. 18, 1972

[54] ELECTROCOATING WITH DESULFATED PIGMENTS

[72] Inventors: Garmond G. Schurr, Palos Heights, Ill.; Bruce M. Morgan, Griffith, Ind.

[73] Assignee: The Sherwin-Williams Company, Cleveland, Ohio

[22] Filed: Sept. 22, 1969

[21] Appl. No.: 860,023

[52] U.S. Cl. ..........................................................204/181
[51] Int. Cl. ...................................B01k 5/02, C23b 13/00
[58] Field of Search.................................................204/181

[56] References Cited

UNITED STATES PATENTS 3,444,064   5/1969   Johnson..................................204/181

*Primary Examiner*—Howard S. Williams
*Attorney*—Richard G. Smith, Richard J. Lustig and Lowell G. Wise

[57] ABSTRACT

Pigments having sulfate impurity are treated with barium hydroxide. Such pigments are useful in producing glossy anodic deposits of pigmented polycarboxylic resins by electrocoating processes. The bath stability over long periods of time can be substantially improved and is valuable in continuous electrocoating processes.

3 Claims, No Drawings

ELECTROCOATING WITH DESULFATED PIGMENTS

BACKGROUND OF THE INVENTION

This invention relates to treatment of inorganic pigments to remove impurities. In particular, it is concerned with the treatment of inorganic pigments to remove water-soluble sulfate impurity. Further, this invention teaches the use of barium-treated pigments in depositing electrophoretic coatings on electrically conductive substrates.

There are numerous advantages of water-based electrocoating compositions over those employing organic solvents—lower cost of materials, uniformity of coating thickness, adaptability of electrocoating to continuous and easily mechanized paint lines, reduced toxicity and fire hazard, ability to deposit films on articles having complex configurations, and reduction of paint losses during application.

Water-based coatings have been used for many methods of application, including roller coating, brushing, dipping and spraying. The use of electrophoresis in depositing synthetic polycarboxylic resins from aqueous baths has emerged as an important industrial process. The most important economic uses of such electrocoating methods have been for painting base materials to provide a protective or decorative finish. In practice, electrocoating has been an immersion process wherein an organic polymer dispersed in an aqueous coating bath is transported toward a conductive surface which is biased with a direct current potential. The pigment materials of this invention have been found to have particularly good properties for electrocoating processes, and the examples given in describing the invention have been made primarily for this use.

After a pigment has been electrodeposited with a film-forming coating vehicle on a substrate from a liquid coating composition, a curing step is necessary to provide chemical resistance, hardness, etc. A curing process which has gained widespread acceptance in water based coatings is the cross-linking reaction of an aminoplast resin with another prepolymer resin having free carboxyl or hydroxyl groups. This curing step is usually carried out by baking the freshly applied film to remove volatile components deposited with the film-forming materials and react the aminoplast resin with the polymeric material.

The long-term storage of pigmented electrodeposition resins in water dispersions has produced deleterious effects in the appearance of electrodeposited coatings. This is manifested in a pronounced decrease in the gloss of the film with aging of the bath. Some agglomeration of the film-forming resin vehicle can be detected. In order to overcome this objectionable instability, it has been necessary in the past to provide fresh mixtures of the pigment, aminoplast, cross-linking resin and hydroxy-containing prepolymer. This is disadvantageous in a production painting line, especially where the quality standards demand accurate blending of the components. The storage life of many prior art coating systems has been limited to a few days.

The primary visual effect of the unstable pigmented electrocoating is the drop in gloss of the cured film; however, the film texture also changes with aging. The ability to obtain a given film thickness in a standard deposition time was diminished considerably by the several days of aging some pigmented systems. This can be demonstrated in the larger voltage required to deposit a given amount of film during a 90-second period.

BRIEF SUMMARY OF THE INVENTION

It has been found that the appearance of electrodeposited coatings from aged baths is affected by the presence of sulfate impurity in the aqueous bath. Furthermore, it has been found that this sulfate impurity may be introduced with pigment material used with the electrodeposition resin in the bath composition. This impurity can be removed by the methods of this invention, including a process of treating sulfate-containing pigments with a water-soluble barium compound.

Accordingly, it is an object of this invention to provide new electrocoating compositions and processes using a desulfated pigment, such as barium-treated titanium dioxide particles, and a water-dispersible polycarboxylic resin at least partially neutralized with a water-soluble base. It is a further object of this invention to provide a purification process for electrocoating pigments including the steps of admixing the impure pigment with an aqueous solution of a barium compound, such as barium hydroxide, separating the treated pigment, washing the pigment, and recovering the desulfated pigment for use in an electrophoretic coating bath.

DESCRIPTION

The present invention can be utilized in removing water-soluble sulfate impurities from pigmentary solids. It is especially useful in treating titanium dioxide particles which are to be dispersed in an electrocoating bath. The source of sulfate impurity is not known to be significant in the treating process. The sulfate may be inherent in the raw material used for manufacturing the pigment, or in the surface treatment of the pigment. Sulfuric acid is used in many pigment manufacturing processes. For instance, the depositing of a silica or alumina surface onto a titanium dioxide core can be effected by acidifying an alkaline slurry with sulfuric acid.

When untreated sulfate-containing pigment is used to formulate electrocoating baths, deposits from freshly made baths do not have any significant decrease in gloss due to the pigmentation. However, after the bath has aged for several days, the gloss of a cured coating may drop more than half its original value. The aging does not appear to have any significant effect on unpigmented resin coatings or coatings containing sulfate-free pigments. There appears to be no correlation between the gloss decrease and pigment particle size.

The treating process comprises several steps: (1) contacting the sulfate-containing pigment in an aqueous slurry with an excess of water-soluble barium compound, (2) separating the treated pigment particles from the treating liquid, and (3) washing the treated particles to remove residual electrolyte. The treated pigments may be dried, or wet-mixed with the electrocoating composition. The pigment may be premixed with the electrodeposition resin prior to dispersing the mixture in a more diluted bath.

The contact time of the barium-treating process can be relatively short. Only a few minutes are required if a substantial stoichiometric excess of barium ion is used. Generally, about 15 minutes is satisfactory.

The relative ratios of pigment, water and water-soluble varium are not critical. Sufficient water should be used to permit agitation of the slurry. Large excesses of the barium compound permit shorter contact times.

The separation step can include centrifuging, filtering or both. The washing is preferably a sequence of small amounts of distilled water, although other pure volatile liquids may be used if they are solvents for the residual electrolytes. It is generally uneconomical to remove the electrolyte completely, and this method usually removes the total electrolyte slightly below the original level. Substantial amounts of nonsulfate electrolyte can remain with most pigments without having deleterious effect on the coating quality. In the examples, the washing purposely reduces the total electrolyte content to about the original level for comparative purposes.

A number of barium compounds are sufficiently water-soluble to be useful in treating the pigments for desulfation. The preferred barium compounds are the oxides and bases BaO, Ba(SH)$_2$·4$_2$O, Ba(OH)$_2$, and Ba(OH)$_2$·8H$_2$O. Barium salts of organic acids—acetic, propionic, butyric, oxalic—may be used. Also barium halides and nitrate are sufficiently water soluble to be useful. In general, those barium compounds which do not introduce deleterious ions and which have a solubility of more than 1 percent are preferred.

The barium treatment of sulfate-containing materials is believed to utilize the reaction of barium ion with sulfate ion to produce insoluble barium sulfate. When the barium treated pigment is introduced to the electrocoating bath, any sulfate present in the bath is in a water-insoluble form and cannot ionize.

The following examples are given to show the effect of several commercial grade pigment materials on electrodeposited films. Units are given in parts by weight unless otherwise specified.

The pigments tested included several commercially available titanium dioxide paint pigments having a particle size of less than 1 micron. These pigments consisted essentially of $TiO_2$ with small percentages of surface treating materials (silica, zinc oxide, alumina, amine). The electrolyte content of these pigments was determined by the method of ASTM D2448–66T, in which the particles are admixed with water to dissolve the electrolyte and the resulting solution is measured in a Wheatstone bridge circuit to determine the electrical resistivity of the electrolyte. The resistivity (ohm-cm.) is inversely proportional to the electrolyte content.

EXAMPLE I a. A barium hydroxide solution is prepared by mixing 50 parts by weight of $Ba(OH)_2 \cdot 8H_2O$ with 950 parts of deionized water. To 800 parts titanium dioxide particles, having an electrolyte content equivalent to an electrical resistivity of 13,400 ohm-cm., and 200 parts water is added 400 parts of the barium hydroxide solution. This mixture is agitated for about 15 minutes and separated by filtering. The treated particles are washed twice with 600–800 parts of distilled water until the electrolyte content was reduced to the level of the untreated particles. The desulfated pigment particles were dried.

b. An electrocoating bath was formulated using the desulfated pigment of example I in an amount equivalent to a pigment volume concentration (PVC) of 12 percent in the cured film. The electrocoating resin comprised 80 parts by weight of an acrylic interpolymer having an acid value of 100 and 20 parts of an aminoplast cross-linking agent (hexaalkoxymethyl melamine). The acrylic polymer was 35 percent neutralized with alkali hydroxide base. Sufficient water was added to obtain a total solids content of 12 percent in the bath.

c. The electrophoretic deposition was conducted on aluminum panels in electrochemical cells having a circulating bath. The voltage was adjusted to produce a baked film approximately 1 mil (0.001 inch) in thickness during a 90-second deposition period. The deposited panels were rinsed with deionized water, baked for 30 minutes at 350° F., and the gloss of the film was measured using a standard 60° meter.

The procedure of example I(b) and (c) was followed in electrodepositing a number of other pigmented films. The conditions were standard for all tests. The results of the experiments are shown in table I, where the bath age is given as fresh (F) or week-old (1–W), the gloss is given as percent reflection for a standard 60° meter, oil absorption number is given in grams of oil per 100 g. pigment, and the bath resistivity and pH are given in their usual units. The electrolyte content of the barium-treated pigment is the same for the desulfated material and for the untreated material.

TABLE I

| Pigment No. | Bath pH | Bath resist. (ohm-cm.) | Film (mils) | Age | Gloss (1%) | Oil abs. | Electrolyte content (ohm-cm.) | Composition |
|---|---|---|---|---|---|---|---|---|
| I | 7.4 | 1,030 | 1.03 | F | 61 | 18.5 | 13,400 | $TiO_2$ min. 94%; $Al_2O_3$ 3.8%; $SiO_2$ 0.07%. |
|   | 7.3 | 940 | 1.09 | 1–W | 23 |  |  |  |
| II | 7.3 | 1,045 | 0.99 | F | 79 | 18 | 11,500 | $TiO_2$ min. 96%; $Al_2O_3$ 2.2%; $SiO_2$ 0.2%. |
|   | 7.3 | 1,095 | 1.04 | 1–W | 55 |  |  |  |
| III | 7.3 | 1,045 | 1.09 | F | 74 | 16 |  | $TiO_2$ min. 94%; $Al_2O_3$ 3.5%; Triethanolamine 0.2%. |
|   | 7.2 | 1,005 | 1.07 | 1–W | 30 |  |  |  |
| IV | 7.4 | 1,025 | 1.10 | F | 70 | 18.5 | 8,200 | $TiO_2$ min. 97%; $Al_2O_3$ 3%. |
|   | 7.3 | 1,020 | 1.05 | 1–W | 52 |  |  |  |
| V | 7.2 | 1,200 | 1.02 | F | 76 | 18.5 | 24,000 | $TiO_2$ min. 94%. $Al_2O_3$ 3.8%; $SiO_2$ 0.07%. |
|   | 7.3 | 1,100 | 1.07 | 1–W | 67 |  |  |  |
| VI | 7.4 | 1,175 | 1.03 | F | 70 |  | 9,600 | $TiO_2$ min. 92%; $Al_2O_3$ 5%; $SiO_2$ 0.3%; ZnO 0.1%. |
|   | 7.4 | 1,075 | 0.97 | 1–W | 60 |  |  |  |
| VII | 7.3 | 1,150 | 1.08 | F | 76 | 13 | 7,300 |  |
|   | 7.2 | 1,100 | 1.00 | 1–W | 66 |  |  |  |
| VIII | 7.5 | 1,090 | 0.95 | F | 65 | 17 | 9,100 | $TiO_2$ min. 88%; $Al_2O_2$ 3%; $SiO_3$ 8%. |
|   | 7.3 | 1,075 | 0.82 | 1–W | 52 |  |  |  |
| IX | 7.5 | 1,085 | 0.93 | F | 64 | 19 | 8,700 | $TiO_2$ min. 90%; $Al_2O_3$ 5%; $SiO_3$ 1.5%. |
|   | 7.3 | 1,050 | 0.73 | 1–W | 36 |  |  |  |
| X | 7.5 | 995 | 0.95 | F | 10 | 35 |  | $TiO_2$ min. 94%; $Al_2O_3$ 2.0%; $SiO_2$ 0.6%; Zno 0.8%. |
|   | 7.4 | 1,000 | 0.92 | 1–W | 5 |  |  |  |
| XI | 7.5 | 1,150 | 0.90 | F | 58 | 16 | 8,900 | $TiO_2$ min. 94% $Al_2O_3$ 3.5%. |
|   | 7.4 | 1,000 | 0.97 | 1–W | 30 |  |  |  |
| I¹ | 7.4 | 1,015 |  | F | 64 |  |  |  |
|   | 7.3 | 970 |  | 1–W | 50 |  |  |  |

¹ Barium treated.

The treatment with barium according to the procedure of example I has a pronounced effect on the gloss of the cured film. Whereas the one week aging of the untreated bath caused a very substantial drip in gloss, a much smaller drop in gloss was noted for the barium-treated pigment.

The variations in bath pH are resistivity for the compositions shown are within the normal range for this type of electrocoating bath. The aging process was conducted under similar conditions to those expected in continuous operation of an electrocoating line. The bath was circulated continuously during the 1-week aging.

The barium treatment may be used for any sulfate-containing pigmented resin system where the water-soluble sulfate impurity poses a problem to the cured coating or bath stability. Although the examples given to describe the invention use acrylic interpolymers and aminoplast, it is within the inventive concept to apply the barium treatment to other water-dispersed systems, such as ester, epoxy, phenolic or other electrocoating resins.

The aging of the same acrylic electrocoating bath used in example I was also applied to pigmented systems containing no sulfate impurity and to unpigmented resin baths. Using the acrylic-aminoplast system, an unpigmented clear electrocoating bath was aged several weeks with no substantial change in the gloss of deposited coatings. Likewise, pigmented systems containing 3 percent PVC carbon black, and 6 percent PVC synthetic iron oxide showed no change in gloss after a one-week aging.

What is claimed is:

1. In an electrocoating process wherein an electrically conductive substrate is coated anodically with a pigmented polycarboxylic resin from an aqueous electrocoating dispersion, the improvement which comprises:
    contacting the pigment with an aqueous barium ion-containing solution, separating the pigment from the solution, washing the pigment to remove soluble material, and dispersing the pigment in the electrocoating bath.

2. The process of claim 1 wherein the pigment contains as its major component particles consisting essentially of titanium dioxide and wherein the pigment contains water-soluble sulfate as an impurity.

3. The process of claim 2 wherein the pigment is treated with a stoichiometric excess of barium hydroxide solution to precipitate the sulfate.

* * * * *